(12) United States Patent
Keidar et al.

(10) Patent No.: US 12,458,809 B2
(45) Date of Patent: Nov. 4, 2025

(54) METHOD AND SYSTEM OF USING PLASMA DISCHARGE TUBE FOR SENSITIZATION OF CANCER CELLS

(71) Applicant: The George Washington University, WasHington, DC (US)

(72) Inventors: Michael Keidar, Baltimore, MD (US); Dayun Yan, Ashburn, VA (US); Xiaoliang Yao, Fairfax, VA (US); Li Lin, Arlington, VA (US); Vikas Soni, Washington, DC (US); Jonathan Sherman, Potomac, MD (US)

(73) Assignee: THE GEORGE WASHINGTON UNIVERSITY, Washington, DC (US)

( * ) Notice: Subject to any disclaimer, the term of this patent is extended or adjusted under 35 U.S.C. 154(b) by 993 days.

(21) Appl. No.: 17/620,032

(22) PCT Filed: Jul. 9, 2020

(86) PCT No.: PCT/US2020/041472
§ 371 (c)(1),
(2) Date: Dec. 16, 2021

(87) PCT Pub. No.: WO2021/007464
PCT Pub. Date: Jan. 14, 2021

(65) Prior Publication Data
US 2022/0305279 A1 Sep. 29, 2022

Related U.S. Application Data

(60) Provisional application No. 62/981,321, filed on Feb. 25, 2020, provisional application No. 62/872,782, filed on Jul. 11, 2019.

(51) Int. Cl.
*A61N 2/00* (2006.01)
*A61K 31/495* (2006.01)
(Continued)

(52) U.S. Cl.
CPC ............ *A61N 2/004* (2013.01); *A61K 31/495* (2013.01); *A61P 35/00* (2018.01);
(Continued)

(58) Field of Classification Search
None
See application file for complete search history.

(56) References Cited

U.S. PATENT DOCUMENTS

2008/0045865 A1 2/2008 Kislev
2014/0378892 A1* 12/2014 Keidar ................. A61B 18/042
604/23

(Continued)

OTHER PUBLICATIONS

Yan et al., "Cold atmospheric plasma, a novel promising anti-cancer treatment modality," Oncotarget, vol. 8. No. 9, p. 15977-15995, 2017 (Year: 2017).*

(Continued)

*Primary Examiner* — Thaddeus B Cox
(74) *Attorney, Agent, or Firm* — NIXON PEABODY LLP

(57) ABSTRACT

A method and system of sensitization of cancerous cells in a volume is disclosed. A plasma tube including a pair of electrodes coupled to a power supply is provided. The plasma tube generates a plasma jet between the electrodes. A controller is coupled to a power supply to control a discharge voltage to the electrodes to generate the plasma jet and direct an electro-magnetic field at the volume having cancerous cells and normal cells for a sufficient time to sensitize the cancer cells. A treatment device applies a treatment such as TMZ to the sensitized cancer cells after the cancer cells are sensitized by the electro-magnetic field.

20 Claims, 8 Drawing Sheets

(51) Int. Cl.
  *A61N 5/10*    (2006.01)
  *A61P 35/00*   (2006.01)
  *A61B 18/00*   (2006.01)
(52) U.S. Cl.
  CPC ............ *A61B 2018/00071* (2013.01); *A61B 2018/00583* (2013.01); *A61N 5/10* (2013.01)

(56) References Cited

U.S. PATENT DOCUMENTS

2016/0001052 A1* 1/2016 Zucker .................. A61K 33/00
                                                      604/24
2016/0030760 A1  2/2016 Srb
2019/0366123 A1* 12/2019 Adler, Jr. .......... A61M 37/0092

OTHER PUBLICATIONS

International Search Report and Written Opinion for PCT/US2020/041472, mailed Dec. 17, 2020, 12 pages.
Kirson et al., "Chemotherapeutic treatment efficacy and sensitivity are increased by adjuvant alternating electric fields (TTFields)"; BMC Medical Physics, 2009, vol. 9, article 1, published Jan. 9, 2009, 13 pages.

* cited by examiner

METHOD AND SYSTEM OF USING PLASMA DISCHARGE TUBE FOR SENSITIZATION OF CANCER CELLS

PRIORITY CLAIM

The present application claims priority to PCT Application No. PCT/US2020/041472 filed on Jul. 9, 2020, which claims priority to U.S. Provisional Patent Application Ser. No. 62/872,782, filed Jul. 11, 2019 and U.S. Provisional Patent Application Ser. No. 62/981,321, filed Feb. 25, 2020. The entirety of all of these applications is hereby incorporated by reference.

STATEMENT OF GOVERNMENT SUPPORT

The subject matter of this application was made with support from the United States government under a contract awarded by the National Science Foundation, Grant Numbers 1465061 and 1747760. The United States government has certain rights in the invention.

TECHNICAL FIELD

The present invention relates generally to cancer cell treatments, and more particularly, using a magnetic field generated from a cold plasma discharge tube for sensitizing cancer cells for a subsequent Temozolomide (TMZ) treatment.

BACKGROUND

Cancer is a well-known health issue. For example, Glioblastoma is the most aggressive type of brain cancer. There is a large amount of research geared toward effective treatment of cancerous cells such as Glioblastoma cells. One area of the research has been directed toward methods of eradicating cancerous cells such as chemotherapy or plasma. Chemotherapy is the standard of care for the treatment of this cancer however, it has limited efficacy and high toxicity. Plasma is an ionized gas that is typically formed in high-temperature laboratory conditions. Recent progress in atmospheric plasmas has led to cold atmospheric plasma (CAP) devices with an ionization temperature close to room temperature. The unique chemical and physical properties of cold atmospheric plasma have enabled its recent utilization in various biomedical applications including cancer therapy.

Cold atmospheric plasma (CAP) produces a wide range of biological effects that can be utilized in cancer therapy. The cold atmospheric plasma is an ionized gas with ion temperature close to room temperature. Therefore, cold atmospheric plasma can interact with organic materials without causing thermal/electric damage to cell structure. A cold atmospheric plasma jet generates reactive oxygen and nitrogen species, as well as three physical factors: thermal radiation, an electro-magnetic field (EMF), and ultra violet (UV) light. A cold atmospheric plasma jet thus can selectively eradicate cancer cells in vitro without damaging normal cells and significantly reduces tumor size in vivo.

Currently, a CAP jet utilizes helium gas and, as such, formation of the CAP jet requires a large amount of helium gas flow. Also, since the jet is emitted from the plasma source and must be oriented toward the cancer cells, environmental changes such as distance, humidity, can cause variations in treatment.

In addition, most CAP technologies are focused on the effect of reactive oxygen and nitrogen species on cancer cells. It has been demonstrated that there is an activation state of cells after the direct cold atmospheric plasma treatment. In this activation state, the cold atmospheric plasma treated cancer cells will enter a unique state that does not cause noticeable cytotoxicity but enhances the sensitivity of cancer cells to reactive oxygen species. To date, apoptosis has been observed to be the main pathway by which CAP triggers cell death. The CAP-triggered apoptosis follows typical apoptotic pathways and cellular morphology changes, including cellular shrinkage, DNA fragmentation, membrane budding, and the formation of the final apoptotic body with membranous vesicles. The uniformity of cell death after the conventional CAP treatment is due to the dominant role of the chemical factors, mainly the reactive species witnessed in previous studies.

Existing experimental evidence shows electromagnetic fields can regulate the expression of genes involved in migration and invasion and disrupt the mitotic spindle similar effect is also observed during treatment with cold atmospheric plasma (CAP). The biological effects of electromagnetic fields have been studied for decades. As an example, the tumor-treating fields approved in 2011 by the U.S. Food and Drug Administration for the treatment of recurrent glioblastoma is an example of the medical application of electro-magnetic fields. The tumor-treating fields are generated via transducer arrays and produce an alternating electromagnetic field with low-intensity, intermediate-frequency (200 kHz). These electromagnetic fields can penetrate the scalp and effectively inhibit the migration of glioblastoma cells, disrupt the formation of their mitotic spindles, and block their proliferation. Furthermore, various studies found that the biomedical use for low intensity and frequency pulsed-electromagnetic fields (LIFP-EMF) can generate 0.3-5 mT peak-to-peak magnitude at a pulse frequency of 20-50 Hz, which could induce apoptosis in cancer cells. Low intensity and frequency pulsed-electromagnetic fields can block the development of neovascularization that is required for blood supply to support tumor growth and induce genetic instability to decrease the stringency of late-cycle (G2) checkpoint. Moreover, studies have found that EMF is innocuous and even beneficial to normal cells. EMF has been demonstrated to lower the number of metastatic tumor sites and slow tumor growth rate when compared to the control group, without showing harmful side effects. Initial clinical studies found that EMF treatments exhibited promising anti-tumor effects as well. However, conventional EMF generation through a cable connected to a power source requires extensive exposure to the generation of the EMF for any effect on cells.

Chemotherapy remains one of the most important anti-cancer treatments in recent decades. Temozolomide (TMZ) is a widely used chemotherapy drug for the prolonging of survival and potential treatment for some brain cancers. However, the use of TMZ is limited due to its severe side effects. For instance, drug-induced parkinsonism and tremors were previously reported in patients treated with TMZ.

There is a need for a method to sensitize cancer cells with an electro-magnetic field before reactive TMZ treatments to mitigate the effects of TMZ. There is another need for a cold non-thermal atmospheric plasma discharged tube that can generate an electro-magnetic field to sensitize cancerous cells prior to other treatment. There is also a need for the application of a pulsed magnetic field from a cold atmospheric plasma to intensify output.

SUMMARY

One disclosed example is a system for sensitization of cancerous cells in a volume including normal cells and the cancerous cells. The system includes a power supply and a plasma tube including a pair of electrodes coupled to the power supply. The plasma tube generates a plasma jet between the electrodes. A controller is coupled to a power supply to control a discharge voltage to the electrodes to generate the plasma jet. The controller directs an electromagnetic field at the volume having cancerous cells and normal cells for a sufficient time to sensitize the cancer cells.

A further implementation of the example system is an embodiment that includes a frequency generator coupled to the power supply and the electrodes through a power switch. The frequency generator controls the power switch at a discharge frequency. The electro-magnetic field is a pulsed electro-magnetic field. Another implementation is where the discharge voltage is between 2 and 10 kV and the discharge frequency is between 10-50 KHz. Another implementation is where the cancerous cells are one of brain cancer cells, breast cancer cells, pancreatic cancer cells, skin cancer cells, bladder cancer cells, colon cancer cells, or lung cancer cells. Another implementation is where the treatment is applying an oxygen or a nitrogen reactive species. Another implementation is where the system includes a treatment device operable to apply a treatment to the sensitized cancer cells after the cancer cells are sensitized by the electro-magnetic field. Another implementation is where the treatment is one of applying an oxygen or a nitrogen reactive species, applying radiation, or applying H2O2. Another implementation is where the treatment includes administration of a chemotherapeutic. Another implementation is where the chemotherapeutic is Temozolomide (TMZ). Another implementation is where the sufficient time is greater than one minute. Another implementation is where the treatment device is adjusted to apply the treatment below a baseline level in response to the sensitized cells.

Another disclosed example is a method of treating cancerous cells in an area. A gas is ionized in a tube via supplying electrical power between an anode and a cathode to create a cold atmospheric plasma jet. An electro-magnetic field is directed from the generated cold atmospheric plasma jet toward the area for a sufficient time to sensitize the cancerous cells.

A further implementation of the example method is an embodiment where the electro-magnetic field is pulsed at a pre-determined discharge frequency. Another implementation is where the discharge voltage is between 2 and 10 kV and the discharge frequency is between 10-50 KHz. Another implementation is where the sufficient time is greater than one minute. Another implementation is where the cancerous cells are one of brain cancer cells, breast cancer cells, pancreatic cancer cells, skin cancer cells, bladder cancer cells, colon cancer cells, or lung cancer cells. Another implementation is where the method includes directing a treatment to the sensitized cells. Another implementation is where the treatment is one of application of an oxygen reactive species or a nitrogen reactive species, application of H2O2, or application of radiation. Another implementation is where the treatment includes administration of a chemotherapeutic. Another implementation is where the chemotherapeutic is Temozolomide (TMZ). Another implementation is where the example method includes reducing the treatment below a baseline level to account for the sensitized cells.

Another disclosed example is a method of treating a cancer patient including selecting a cancer patient that has been treated by a first treatment. The first treatment is applied from a system including a power supply and a plasma tube including a pair of electrodes coupled to the power supply. The plasma tube generates a plasma jet between the electrodes. The system includes a controller coupled to a power supply to control a discharge voltage to the electrodes to generate a plasma jet and direct an electromagnetic field at a volume having cancerous cells on the patient for a sufficient time to sensitize the cancer cells. An effective dose of a second treatment for cancer is administered to the cancer patient.

A further implementation of the example method is an embodiment where the second treatment is one of application of an oxygen reactive species or a nitrogen reactive species, application of H2O2, application of radiation, of administration of a chemotherapeutic. Another implementation is where the chemotherapeutic is Temozolomide (TMZ).

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

FIGS. 6A-6B are graphs of different results from application of electro-magnetic fields, application of TMZ treatment, and both on non-cancerous E6 and E7 cells.

Figure 1A:
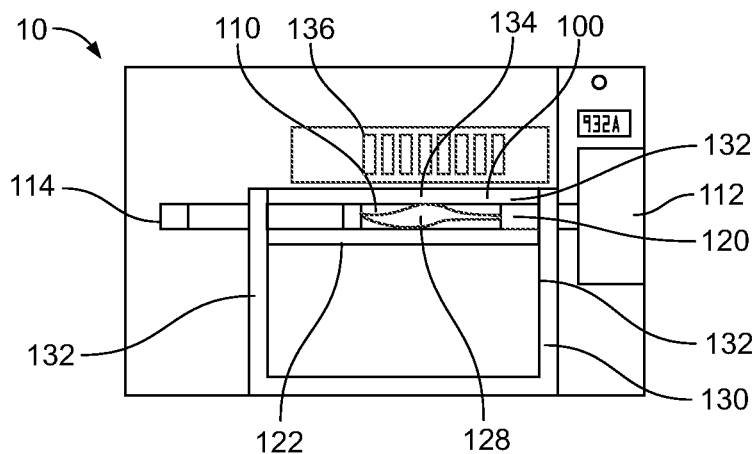
FIG. 1A is an example in vitro test system to demonstrate use of a plasma tube to generate electromagnetic fields to sensitize in vitro cancer cells.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

This disclosure is directed toward a treatment method and system using a plasma discharge tube to generate an electro-magnetic field for sensitizing cancer cells for a subsequent treatment. In this example, the subsequent treatment is the application of Temozolomide (TMZ), the standard of care chemotherapeutic drug for the treatment of glioblastoma. The discharge tube device operates with helium gas in a sealed glass tube and generating a plasma discharge in the tube.

The results from the in vitro study showed that after a single 7-minute treatment with discharge tube, the anticancer efficacy of TMZ is increased by more factor of 2 in U87 and A172 glioblastoma cell lines, while having no significant effect in the E6/E7 cell line (non-tumor cell line). The main advantage of this approach is that it offers a non-invasive treatment approach and no helium gas flow is required for the device.

Figure 1B:
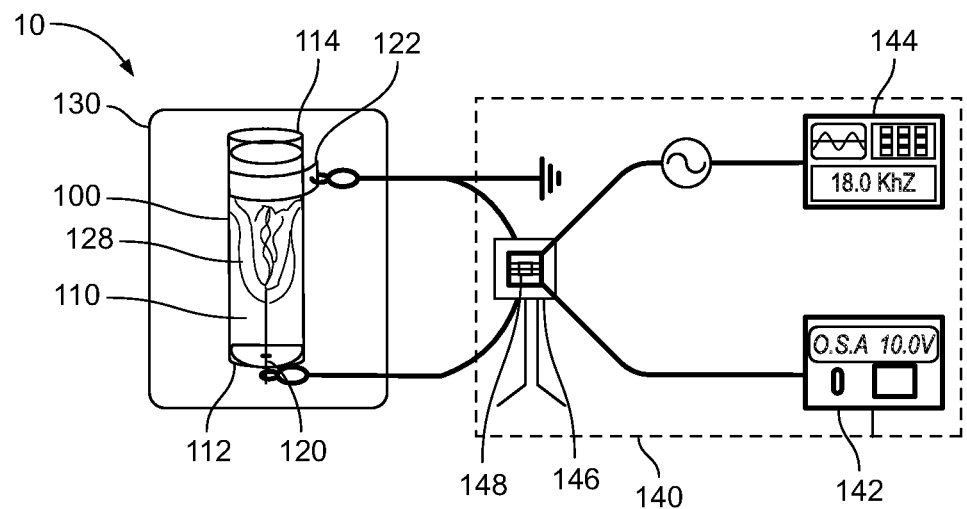
FIG. 1B is a block diagram of the components of the in vitro test system in FIG. 1A.

FIG. 1A shows an example experimental in vitro test system 10 for sensitization of cancer cells. FIG. 1B shows a block diagram of the components of the test system 10. The test system 10 includes an enclosed plasma discharge tube 100 that allows the application of an electro-magnetic field to sensitize cancer cells for effective reactive oxygen species treatment. The discharge tube 100 includes a quartz cylindrical body 110 with opposite ends 112 and 114. The tube body 110 is filled with helium from the end 114 before it is sealed on both ends 112 and 114. An electrode 120 that receives a DC power signal is mounted on the end 112. A ground electrode 122 is mounted at a distance from the end 114. In this example, both electrodes 120 and 122 are ring shaped, allowing the helium gas to circulate along the length of the tube body 110. The electrode 122 in this example is a copper wire electrode located at one end of the tube and is grounded. When an electrical signal is applied, a plasma discharge is created between the electrodes 120 and 122. Since the electrodes 120 and 122 are ring shaped, the plasma discharge is spread out radially from the tube body 110.

In this example, helium gas is fed into the quartz tube body 110 and the tube body 110 is sealed on both ends 112 and 114 with hot glue. In this example, the quartz tube body 110 is 100 mm long. A plasma discharge 128 is generated by providing DC voltage to the electrode 120 at a predetermined frequency. In this example, the plasma discharge 128 is generated inside the tube body 110 from a 1/99 air to helium ratio and it is about 70 mm in length between the two electrodes 120 and 122.

In this example, the system 10 includes a box housing 130. The box housing 130 contains the plasma discharge tube 100 on the interior. The housing 130 includes exterior supports 132 that suspend an upper structure 134 above the plasma discharge tube 100. The exterior supports 132 include apertures that allow the plasma discharge tube 100 to be oriented horizontally. An inverted 96-well plate 136 is placed on the upper structure 134 in proximity to the plasma discharge tube 100. In this manner, test cells in the well plate 136 are at a certain distance from the emitted electro-magnetic field.

Alternatively, the housing 130 may include supports for holding the plasma discharge tube 100 in a vertical orientation. In this example, the well plate 136 is further from the electro-magnetic field generated by the plasma discharge tube 100 relative to the plasma tube 100 in a horizontal orientation.

The box housing 130 that houses the plasma discharge tube 100 may be 3D printed or conventionally fabricated. Cells may be tested in vitro by placing the 96-well plate 136 above the discharge tube 100 in such a manner that the discharge tube 100 does not come in direct contact with the bottom of the plate 136. A culture medium is placed in each of the wells of the plate 136 along with the cells to be tested. In this example, the gap between the plate 136 and the plasma discharge tube 100 is set to 1 mm to prevent any unexpected heating effects on the plate. Of course, other distances may be tested by increasing the gap to 5 mm or 10 mm.

A control signal generator 140 supplies a pulsed signal to the electrode 120 to generate a pulsed electro-magnetic field from the plasma discharge in the tube 110. The generator 110 includes a DC power source 142 and a frequency generator 144. The DC power source 142 is coupled to a transformer 146 to provide voltage at a predetermined value. The output of the frequency generator 144 is coupled to the gate of a power switching device 148. In this example, the power switching device 148 is an insulated gate bi-polar transistor (IGBT). The frequency generator 144 turns the power switching device 148 on and off to cause the plasma tube to generated a pulsed electro-magnetic field.

The adjustment of voltage and frequency from the power source 142 and the frequency generator 144 allows the strength and frequency of the pulsed magnetic field generated by the plasma tube 100 to be controlled. In this example, the output voltage is set to 5.18 kV peak-to-peak and the frequency is set to 18 kHz. The output voltage is proportional to the power density. Thus, voltage values may be selected in the 2-10 kV range. The frequency may be selected from a range of 10-50 kHz.

Compared with a continuous electro-magnetic field, the pulsed electro-magnetic field produced by the control signal generator 140 and plasma tube 110 has a faster rising-edge. The pulsed electro-magnetic field produced by the plasma tube 110 causes a stronger induced electric field and a wider spectrum without significant thermal effect.

Figure 1C:
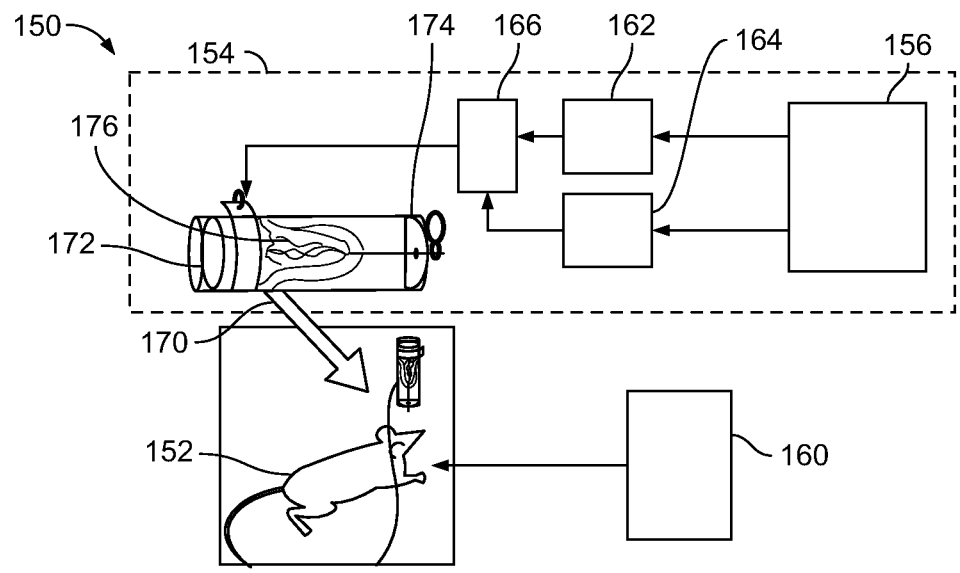
FIG. 1C is a block diagram of an in vivo cold atmospheric plasma system for sensitizing an area of a subject with cancer cells with an electro-magnetic field.

FIG. 1C is a block diagram of an in vivo cancer treatment system 150 that subjects an area of normal cells and cancerous cells on a subject 152 to an electro-magnetic field generated by a cold atmospheric plasma device 154. In this example, the subject 152 is a test subject such as a laboratory animal, but it is to be understood the system 150 may be used as part of the treatment for patients with cancerous cells. The cold atmospheric plasma device 154 emits a pulsed electro-magnetic field. A controller 156 allows a user to control the intensity, frequency, and duration of the pulsed electro-magnetic field generated by the cold atmospheric plasma to selectively sensitize the cancerous cells in the subject 152. As will be explained, the controller 156 is operative to control the plasma device 154. Thus, the controller 156 allows control of the plasma generated pulsed electro-magnetic field to increase sensitivity of cancerous cells.

A treatment system 160 such as a medicine dispensary for chemotherapy or radiation device is provided for any standard treatment of cancerous cells in the subject 152 after the application of the pulsed electro-magnetic field generated from the cold atmospheric plasma device 154. In this example, the treatment system 160 provides a chemotherapeutic such as TMZ to change the cancer cells to an apoptotic state. However, the treatment system 160 may provide reactive oxygen species or reactive nitrogen species to change the cancer cells to an apoptotic state in the area on the patient 152. Alternatively, the treatment system 160 may generate radiation to change the cancer cells to an apoptotic state. In some examples, the TMZ of the treatment system 160 may be administered orally. Of course other well-known routes may be taken in the administration of chemotherapeutics other than TMZ. For example, other chemotherapeutics such as Afinitor (Everolimus), Afinitor Disperz (Everolimus). Avastin (Bevacizumab). Bevacizumab, BiCNU (Carmustine), Carmustine, Carmustine Implant, Everolimus. Gliadel Wafer (Carmustine Implant), Lomustine, Mvasi (Bevacizumab), or drug combinations such as PCV may be used for brain cancer cells. Other chemotherapeutics may be used for other types of cancerous cells in conjunction with the sensitization of the cancerous-cells by the described electro-magnetic field from a cold plasma tube.

The cold plasma emitter device 154 includes a power supply 162, a frequency generator 164, a power switching device 166, and a glass tube 170. In this example, the glass tube 170 holds an anode electrode 172, and a cathode electrode 174 at opposite ends of the tube 170. The tube 170 may also be fabricated from any suitable material such as quartz. Power to the anode electrode 172 and the cathode electrode 174 from the power supply 162 produces a plasma jet 176 within the glass tube 170.

The high voltage power supply 162 is electrically connected to the anode 172 and cathode 174 through the power switching device 166. The frequency generator 164 is coupled to the controller 156 and the power switching device 166. The frequency generator 164 thus switches the switching device 166 on and off to control the frequency of the power supplied to the cold plasma emitter device 154 to regulate the emitted pulsed electro-magnetic field. The controller 156 is coupled to the high voltage power supply 162 and regulates the discharge voltage and frequency that is applied to the anode 172 and cathode 174 and therefore controls the intensity of the plasma generated in the tube 170.

The pulsed electrical signal on the anode 172 and the cathode 174 excite the gas in the tube 170, thereby ionizing the gas to form the cold plasma jet 176. In this example, the gas is helium, though other gases such as nitrogen may be used. The positioning of the glass tube 170 allows the electro-magnetic field generated by the plasma jet 176 to be targeted at desired cancer cells in the skin to selectively sensitize the cancerous cells in an area of the subject 152. The generated electro-magnetic field may be utilized, for instance, to sensitize cells of any cancer type that is close to the skin and can be applied without surgery, such as for breast, colon, lung, bladder, or oral cancers. With surgery, the system 150 may be applied to any tumor.

In this example, the tube 170 is connected to a voltage of 2-10 kV and a frequency of 10-50 KHz to generate the electro-magnetic field. Of course, other voltages, currents, and frequencies may be used. In this example, a mechanical actuator may be deployed to move the location of the glass tube 170 and thereby change the predetermined distance between the glass tube 170 and the target area. The mechanical actuator may be controlled by the controller 156.

Figure 1D:
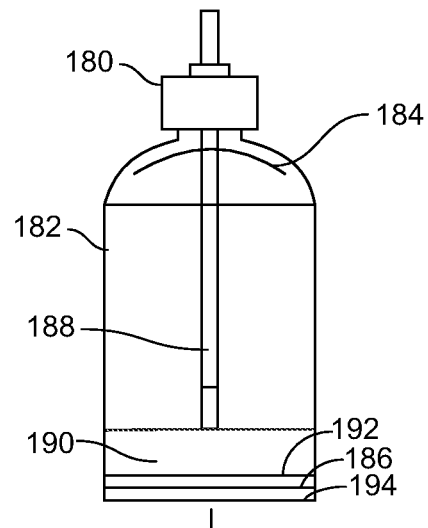
FIG. 1D shows a different version of the plasma tube that may be used for the systems shown in FIGS. 1A-1C.

FIG. 1D shows an alternate plasma tube 180 that may be used to generate a pulsed electro-magnetic field in either the in vitro test system 10 in FIG. 1A or the in vivo system 150 in FIG. 1C. The alternate plasma tube 180 includes a glass or quartz body 182 that has a narrow end 184 and an opposite cylindrical end 186. A needle electrode 188 is suspending along the central axis between the ends 184 and 186. The needle electrode 188 in the center of the tube 180 is coupled to the power source and frequency generator. A cylindrically shaped electrode 190 is located outside the tube 180 near the opposite cylindrical end 186. In this case when power is applied to the electrodes 188 and 190 a plasma jet is formed between the needle electrode 188 and the walls of the tube covered by the electrode 190. The generated electro-magnetic field is thus emitted primarily in a direction through the end 186. A thermal shield 192 and an ultra-violet light shield 194 are positioned at the end 186 to shield emitted heat and UV radiation from the target of the generated electro-magnetic field.

Figure 2A:
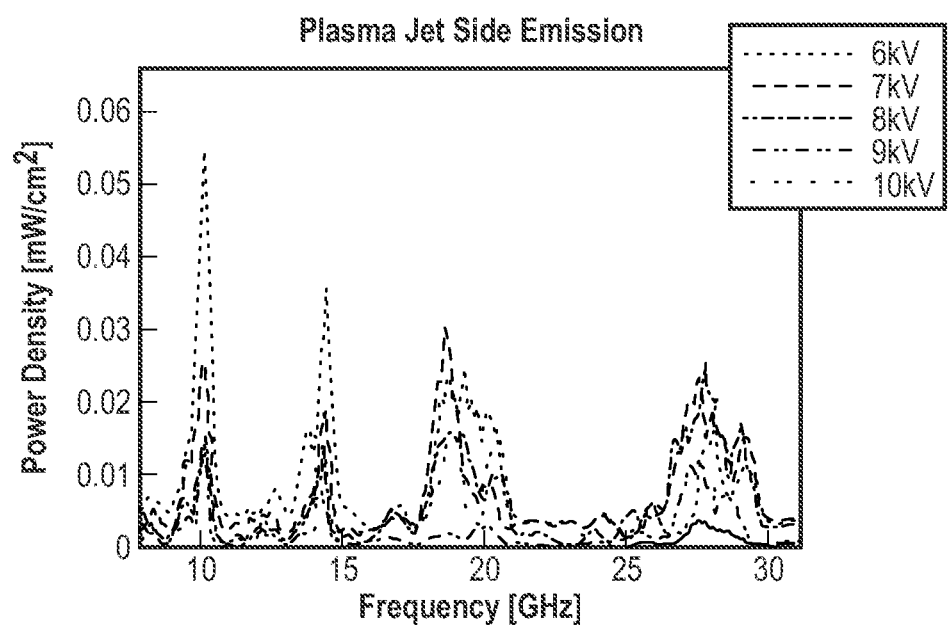
FIG. 2A is a graph showing the spectro-measurements of different voltages applied to produce the plasma jet in the system in FIG. 1A.

In one example, a heterodyne setup measured the radio frequency (RF) emission from a plasma jet such as the plasma get generated by the plasma tube 100 in FIG. 1A. FIG. 2A shows the RF emission spectra of a cold atmospheric plasma jet under different discharge voltages (peak to peak). FIG. 2A is a graph of electro-magnetic spectra measurements of power density from the plasma discharge tube 100 in FIG. 1A at different input voltages (6 kV, 7 kV, 8 kV, 9 kV, and 10 kV) over a range of GHz frequencies. As shown in FIG. 2A, the spectrum has four peaks. For the peaks at around 10 GHz and 14.5 GHz, a higher discharge voltage leads to a lower power density. For the two peaks at higher frequency, however, increasing the discharge voltage may first increase the power and subsequently decrease it. The power density reaches its maximum value when the discharge voltage is around 8 kV (peak to peak). In addition, for some power density peaks, the frequency shifts can also be observed on the spectrum.

Figure 2B:
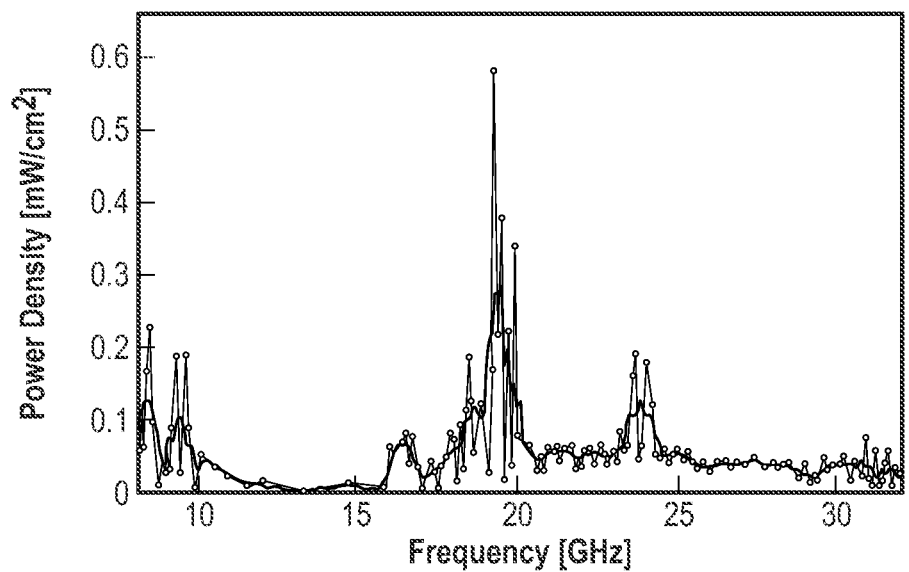
FIG. 2B is a graph of the discharge current and voltage signals for the system in FIG. 1A.

FIG. 2B is a graph of the electro-magnetic spectra measurements from the plasma discharge tube 100 in FIG. 1A operated at an input voltage of 5.18 kV (peak-to-peak). The graph in FIG. 2B shows power density over a range of frequencies. As may be seen by the graphs in FIGS. 2A-2B, the pulsed electro-magnetic fields are generated with a peak at 20 GHz, which is the plasma frequency.

Figure 3:
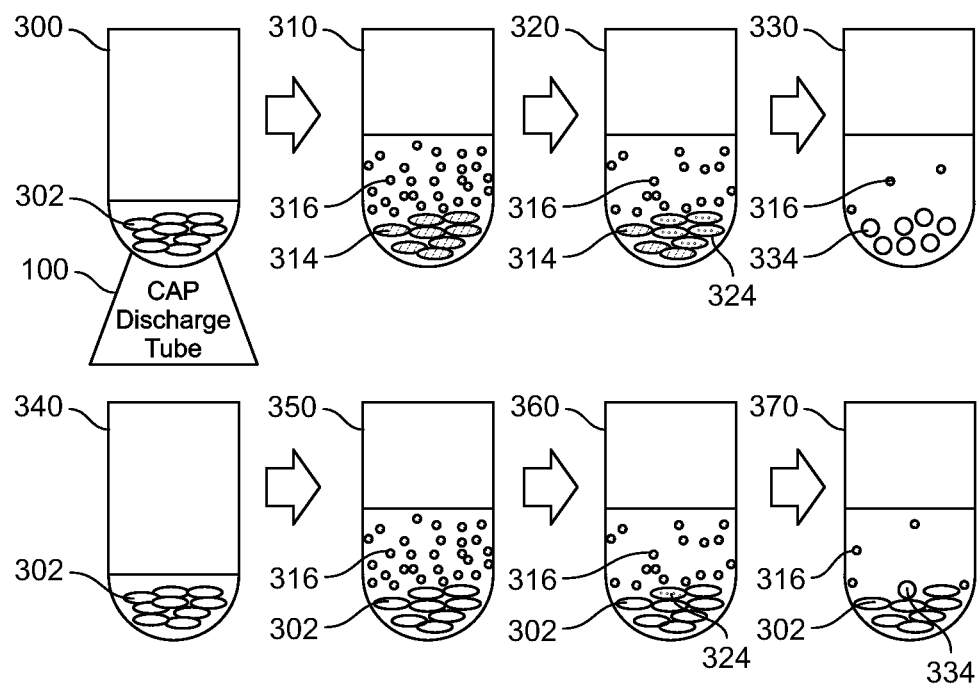
FIG. 3 is a diagram showing the different states of cancer cells after being sensitized from the electro-magnetic field generated by a plasma system.

FIG. 3 shows different stages of the cancerous cells during the process involving the sensitivity treatment involving the magnetic field generated by the cold atmosphere plasma tube such as the tube 100 in FIG. 1A and subsequent TMZ treatment. A first stage 300 occurs with the application of a plasma tube generated electro-magnetic field treatment via a system such as the system 10 in FIG. 1A. The electro-magnetic field is generated by the plasma tube 100 and applied to unsensitized cancer cells 302. A second stage 310 occurs immediately post application of the plasma discharge tube sensitivity treatment. In the second stage 310, the cancer cells are transformed into sensitized cells 314 based on the treatment of the electro-magnetic field. A reactive species such as TMZ 316 is added to the sensitized cells 314 in the second stage 310. A third stage 320 occurs after the application of a cancer treatment such as TMZ 316. The TMZ 316 have begun to diminish in the third stage 320. The sensitized cells 314 have now become damaged cells 324 due to the application of the TMZ treatment. A fourth stage 330 occurs after a pre-determined time from the application of the TMZ treatment. In the fourth stage, the TMZ 316 has largely disappeared, but the damaged cells 324 have become apoptotic cells 334 due to the increased sensitivity that is created by the electro-magnetic field and thus increases the effectiveness of the TMZ treatment.

FIG. 3 also shows the effects without previous sensitization in a series of control stages 340, 350, 360 and 370. The first control stage 340 omits the application of the plasma tube generated electro-magnetic field to unsensitized cells 302 in stage 300. In the second control stage 340, the TMZ 316 is added to the unsensitized cells 302. As shown in the third control stage 360, only a small portion of the cancer cells 302 are affected and become damaged cells 324. Most of the cancer cells 302 remain. The final control stage 370 shows that only a few of the cancer cells become apoptotic cells 334.

In one experiment conducted using the test system 10 in FIGS. 1A-1B, human glioblastoma cancer cell lines U87 and A172 as well as non-brain cancer cell lines E6/E7 were provided from the ATCC (City of Manassas, VA), and were grown in Dulbecco's Modified Eagle Medium (Gibco) supplemented with 10% fetal bovine serum (Atlanta Biologicals) and 1% penicillin-streptomycin solution (Invitrogen) under standard cell culture conditions (humidified atmosphere with 5% CO2 at 37° C.). After one passage, 10,000 cells in 100 μL medium were seeded into 96-well plates such as the plate 134 in FIG. 1A. The cells were cultured for 24 hours before the experiment was performed to ensure proper cell attachment and stability.

A HT-02D Handheld Digital IR Infrared Thermal Imaging Camera Thermometer was used for thermal imaging of the 96-well plates following plasma discharge tube treatment. The captured thermal images confirmed that the plasma discharge tube did not cause any thermal damage on the cells.

Cell viability was analyzed by using an MTT assay available from Sigma-Aldrich, which is a colorimetric assay for analyzing the cell metabolic activity. The MTT protocol is based on NAD(P)H-dependent cellular oxidoreductases, which reduces the water-soluble MTT ((3-(4,5-dimethylthiazol-2-yl)-2,5-diphenyltetrazolium bromide) to an insoluble formazan product. Cells with active metabolism can transform MTT into formazan; however, dead cells cannot transform MTT into formazan and will not show detectable signal. The measured absorbance at OD 590 nm is proportional to the number of viable cells.

Following treatment with an electro-magnetic field generated from the example plasma tube, the cells were cultured for 72 hours. A total of 100 μL MTT solution (7 mg Thiazolyl Blue Tetrazolium Blue in 10 ml DMEM) was added to each well. Cells were cultured for an additional 3 hours at 37° C., and then the MTT solution was aspirated and a 100 μL solvent was added to dissolve the formazan crystals. The result was recorded with a Synergy H1 Hybrid Multi-Mode Microplate Reader at 570 nm. For each condition (treatment time, voltage, drug concentration), the experiments were performed in triplicates and were repeated independently 3 times.

For each experiment, there were 15 samples, and each experiment was repeated at least 6 times. Results were expressed as the mean value±standard deviation (SD) for six independent determinations. Biological activity was the result of one individual experiment. The significance of all data was checked analyzed using the student's t-test with ($p<0.05$) considered statistically significant.

The temperature of 96-well plates after 7 minutes of treatment with the plasma discharge tube has the maximum value. Moreover, the smaller the gap between the plasma discharge tube and the 96-well plate, the higher the temperature. However, the maximum temperature in the 1 and 5 mm gaps after 7 minutes of treatment was 32.3° C. This temperature is lower than the standard temperature under which cells were cultured (37° C.). Thus, the thermal effect of the plasma discharge tube 100 to cells is negligible.

In this example, four different experimental cell groups were used. The first experimental group was the control group. For each well of the plates for the control group, the cell culture media was removed before the treatment applied to the other experimental groups. After the treatment was applied to the other experimental groups, 100 μL, fresh cell culture media for each well was added to the cells of the control group.

The second experimental group is the tube-only group. For the tube-only group, the cell culture media was removed before the treatment as well. After that, the cells were treated by placing the plate 134 on the side of the discharge tube 100 in FIG. 1A, with a distance of 1 and 5 mm between the plate 134 and the tube 100. The cells in the plate were exposed to the electro-magnetic field for 1, 4 and 7 minutes. 100 μL fresh cell culture media for each well was added to the cells after the treatment.

The third experiment group is the drug-only group. For the drug-only group, the cell culture media was removed before the treatment via electro-magnetic field applied to the other experimental groups. After the treatment of the other groups, 100 μL fresh cell culture media with 180, 250, 320 μM of TMZ for each well was added to the cells.

The last experimental group is a combination group. For the combination group, the cell culture media was removed before the treatment as well. Then, the cells were treated by placing the plate 134 on the side of the discharge tube 100 at a distance of 1 and 5 mm. The electro-magnetic field was applied for 1, 4 and 7 minutes. Following the treatment, 100 μL, fresh cell culture media with 180, 250, and 320 μM of TMZ for each well was added to the cells.

Figure 4A:
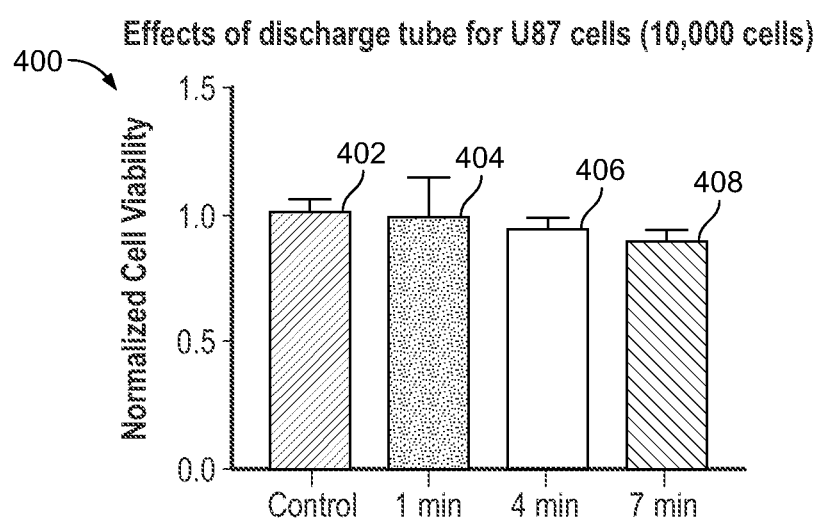
FIG. 4A-4E are graphs of different results from application of electro-magnetic fields, application of TMZ treatment, and both on U87 cancerous cells.

The results of the cold atmospheric plasma tube only group in relation to U87 cells are shown in a graph 400 in FIG. 4A. The graph 400 plots normalized cell viability and includes a bar 402 representing the control group, and bars 404, 404, and 406, representing groups that received one, four and seven minute treatments respectively on U87 cells. As may be seen in the graph 400, the treatments with the electro-magnetic field generated by plasma discharge tube for 1, 4 or 7 minutes caused about 10% cell death on U87 cells. The electro-magnetic field generated by the CAP alone did not cause noticeable damage to the U87 cells.

Figure 4B:
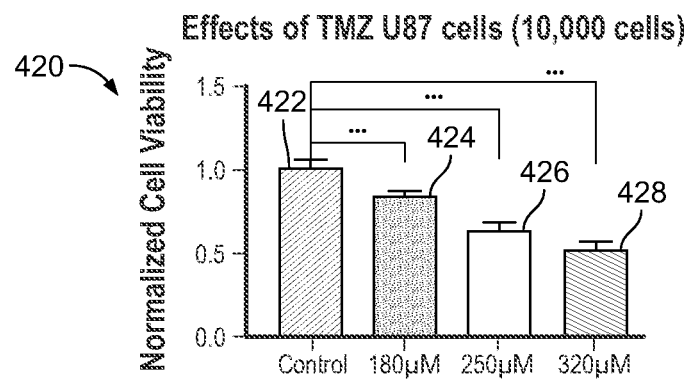

The results of the drug only group are shown in a graph 420 in FIG. 4B. The graph 420 shows bars 422, 424, 426, and 428 of normalized cell viability. The bar 422 represents the control group, and the bars 424, 426, and 428 represent the cells having cell culture media with different volumes (180, 250, and 320 μM) of TMZ applied. In this example, the different volumes of TMZ were used to affect the growth of U87 cells without the treatment of an electro-magnetic field generated by a plasma discharge tube, following the protocols described above. As shown in comparison to the control group bar 422, the growth of U87 cells was inhibited by 21% with 180 μM TMZ in bar 424, 37% with 350 μM TMZ in bar 426, and 50% with 320 μM TMZ in bar 428. The inhabitation effect became more significant as the TMZ concentration increased.

Figure 4C:
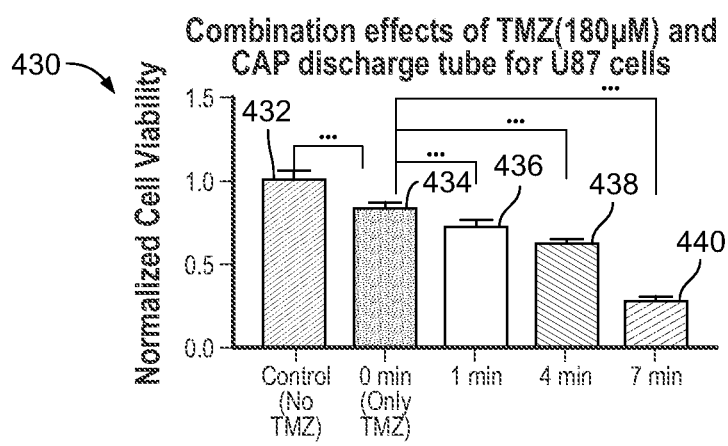

The result of the combination group is shown in the graph 430 in FIG. 4C. The graph 430 shows a bar 432 for the control group and a bar 454 representing only TMZ treatment of normalized cell viability. The bars 436, 438, 440 represent respective 1, 4, and 7 minute exposure to the electro-magnetic field generated by the plasma tube 100 in FIG. 1A with the addition of 180 μM of TMZ. As shown in FIG. 4C, in contrast with the TMZ only group represented by the bar 434, where 180 μM TMZ caused about 21% cell death, the combination groups represented by bars 436 (1 minute treatment), 438 (4 minute treatment), and 440 (7 minute treatment) caused 24%, 38% and 72% inhibition of the growth of U87 cells with the 180 μM TMZ.

Figure 4D:
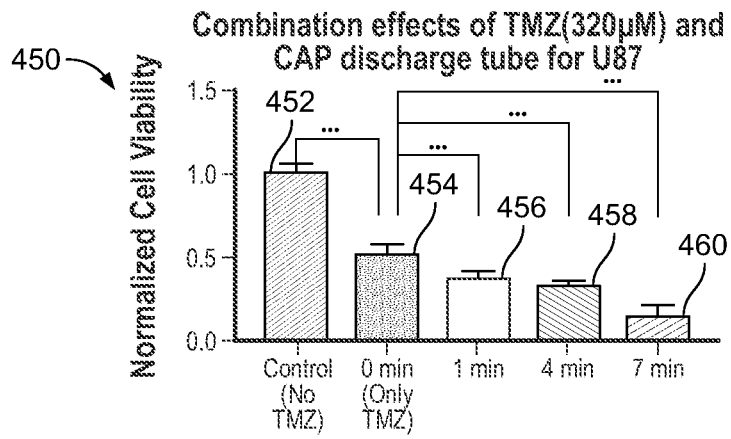

FIG. 4D shows another graph 450 of groups of cells that were treated by the plasma tube device and a different volume TMZ (320 μM) treatment in relation to cell viability. The bar 452 shows the control group. The bars 456, 458, 460 represent respective 1, 4 and 7 minute exposure to the electro-magnetic field generated by the plasma tube 100 in FIG. 1A, with the addition of cell culture medium having 320 μM of TMZ. As shown in FIG. 4D, in contrast with the TMZ only group of the bar 454, where 320 μM TMZ caused about 21% cell death, the combination groups represented by bars 456 (1 minute treatment), 458 (4 minute treatment), and 460 (7 minute treatment) caused close to 80% inhibition of the growth of U87 cells with the 320 μM TMZ. A similar pattern was also found for the combination treatment with TMZ concentrations of 250 μM.

Figure 4E:
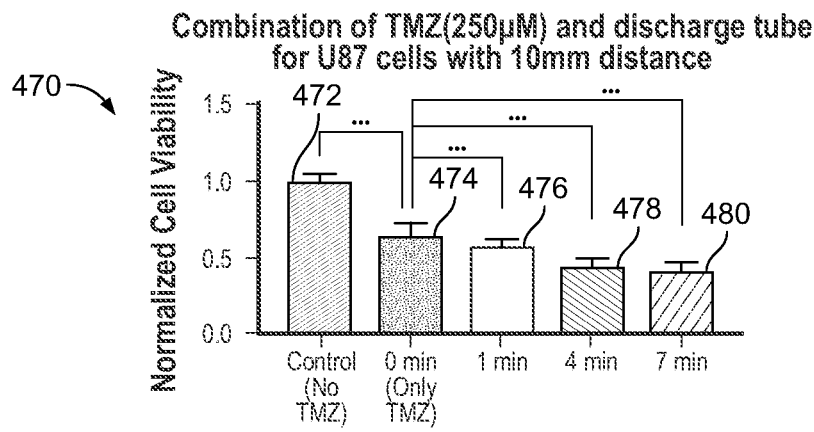

Furthermore, the relationship between the strength of the sensitization effect and distance of the cell culture plate to the plasma discharge tube 100 was comprehensively investigated. The same protocol was repeated for placing the plate 134 above the discharge tube 100 at a distance of 10 mm. U87 cancerous cells were treated with a culture medium including 250 μM of TMZ. FIG. 4E shows a graph 470 that were treated by the plasma tube device at a distance of 10 mm and treated with 250 μM TMZ in relation to cell viability. The bar 472 shows the control group. The bars 476, 478, 480 represent respective 1, 4 and 7 minute exposure to the electro-magnetic field generated by the plasma tube 100 in FIG. 1A, with the addition of cell culture medium having 320 μM of TMZ.

In contrast with the results with a distance of 1 mm between the plasma tube and the well 134, the synergy effect lowered if the distance between the cell culture plate 134 and plasma discharge tube was increased 100. As shown in comparing the graph 450 in FIG. 4D with the graph 470 in FIG. 4E, the killing effect decreased from 80% to 60% when the distance between the plasma tube and the cell plate changed from 1 mm to 5 mm.

Figure 5A:
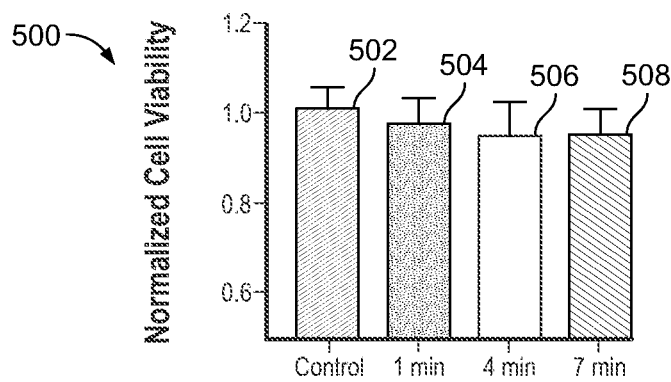
FIGS. 5A-5B are graphs of different results from application of electro-magnetic fields, application of TMZ treatment, and both on A139 cancerous cells.

A172 glioblastoma cells were also studied to confirm the sensitization effect of the electromagnetic field emitted by the plasma discharge tube 100 in FIG. 1A. The same treatment protocol described above for followed for the A172 cell line. FIG. 5A shows a graph 500 that plots normalized cell viability for cell groups receiving electromagnetic field treatment. The graph 500 includes a bar 502 representing the control group and bars 504, 504, and 506, representing groups that received 1, 4 and 7 minute treatments respectively on A172 cells. As may be seen, the treatments with the plasma discharge tube for 1, 4 or 7 minutes caused about 10% cell death on A172 cells. The CAP treatment alone did not cause noticeable damage to A172 cells.

Figure 5B:
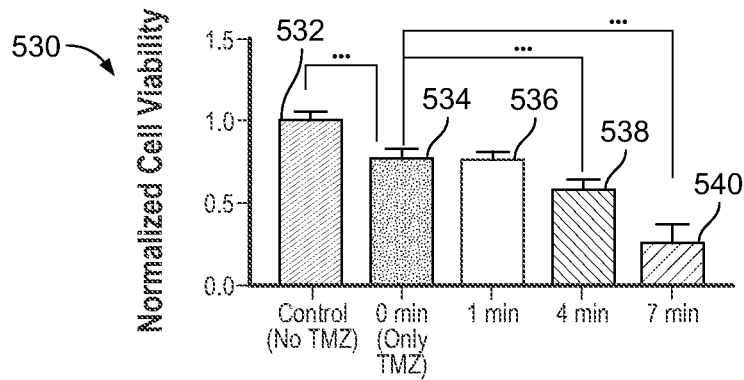

The result of the combination group of A172 cells is shown in the graph 530 in FIG. 5B of normalized cell viability. The graph 530 shows a bar 532 for the control group and a bar 534 representing only TMZ treatment. The bars 536, 538, 540 represent 1, 4 and 7 minute exposure of the A172 cells to the electro-magnetic field generated by the plasma tube 100 in FIG. 1A at a distance of 1 mm. A cell culture medium having 250 μM of TMZ was added to the cells after the exposure to the electro-magnetic field. As shown in FIG. 5B, the cell growth of A172 cells was inhibited by 23% in 250 μM TMZ as shown by the bars 536 and 538 in comparison with the bar 534. After the combination of the electro-magnetic field exposure for 7 minutes, and application of 250 μM TMZ, cell viability of A172 cells was reduced by 76% as shown by the bar 540 in comparison with the bar 534. FIG. 5B thus shows that the effect of the electro-magnetic field generated from the plasma discharge tube on A172 cells was similar to that in U87 cells.

Figure 6A:
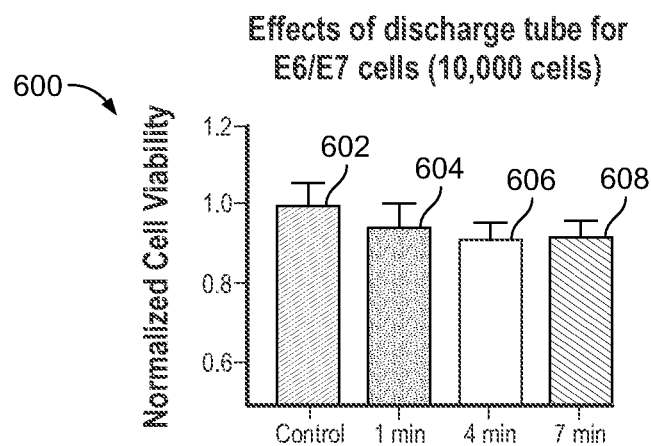
Figure 6A:
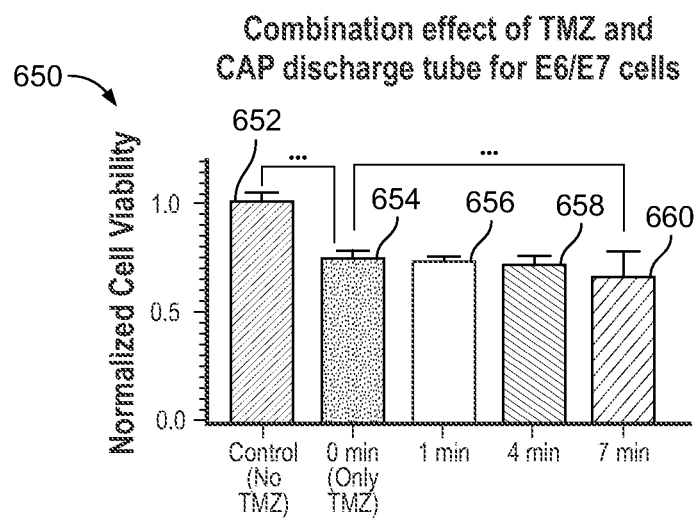

The study also showed that no significant non-cancerous cell death was caused by a single treatment with application of the electro-magnetic field generated by the plasma discharge tube alone. FIG. 6A shows a graph 600 of normalized cell viability after exposure from an electro-magnetic field from the plasma discharge tube 100 alone on non-cancerous hTERT/E6/E7 cells. The same protocol detailed above was repeated for placing the plate 134 on the side of the discharge tube 100 in FIG. 1A at a distance for 1 mm. A bar 602 shows the viability of the hTERT/E6/E7 cells in the control group that was not exposed to the electro-magnetic field. A bar 604 shows the viability of hTERT/E6/E7 cells with 1 minute exposure to the electro-magnetic field. A bar 606 shows the viability of hTERT/E6/E7 cells with 4 minute exposure to the electro-magnetic field. A bar 608 shows the viability of hTERT/E6/E7 cells with 7 minute exposure to the electro-magnetic field.

FIG. 6B shows a graph 650 of normalized cell viability of a group of hTERT/E6/E7 cells with a combination of electro-magnetic field exposure and TMZ treatment. The graph 650 shows a bar 652 for the control group and a bar 654 representing only TMZ treatment. The bars 656, 658, 670 represent 1, 4, and 7 minute exposures of the E6/E7 cells to the electro-magnetic field generated by the plasma tube 100 in FIG. 1A at a distance of 1 mm. A cell culture medium having 250 μM of TMZ was added to the hTERT/E6/E7 cells after the exposure to the electro-magnetic field.

Comparing the data of the control group in FIG. 6A and the 7 min treatment group represented by the bar 608, the inhabitation effect of a single plasma discharge tube for non-cancer cells was not significant. As shown in FIG. 6B, the sensitization effect of an electro-magnetic field generated by the plasma discharge tube 100 for non-cancerous cells was reduced hardly relative to cancerous cells. There is no significant sensitization effect difference between the group of cells that were treated with TMZ and 4 minutes of the electro-magnetic field from the discharge tube 100 as represented by the bar 658 and the group of cells only treated by TMZ represented by the bar 654.

Figure 7:
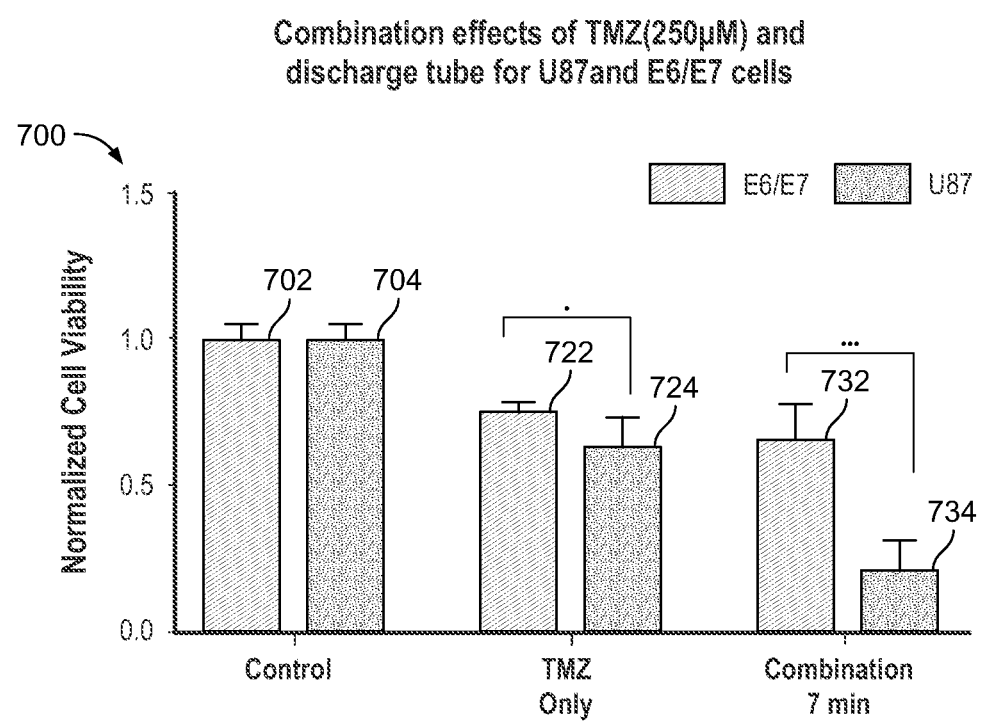
FIG. 7 is a graph that shows the combination effect of a reactive treatment and an electro-magnetic field for cancerous cells in contrast to non-cancerous cells.

Even though there is an effect after 7 minutes of exposure to the electro-magnetic field and TMZ treatment afterward, the effects on the non-cancerous cells from such a combination treatment is less than the effect on the cancer cells. FIG. 7 shows a graph 700 that plots the normalized cell viability of cancerous U87 cells and non-cancerous E6/E7 cells. A bar 702 shows a control group of non-cancerous cells and a bar 704 shows a control group of cancerous U87 cells. A bar 712 shows a group of non-cancerous cells that were treated with TMZ while a bar 714 shows a group of cancerous cells that were treated with TMZ. Finally, a bar 722 shows a group of cancerous cells that were exposed to 7 minutes of an electro-magnetic field generated by the plasma tube 100. A bar 724 shows a group of non-cancerous cells that were exposed to 7 minutes of an electro-magnetic field generated by the plasma tube 100.

As shown in FIG. 7, the TMZ-only treatment caused a 12% higher cell death in U87 cells compared to the E6/E7 cells. The exposure to the electro-magnetic field from the plasma discharge tube prior to TMZ treatment caused a 43% increase in U87 cell death compared with non-cancerous cells.

Thus, the effect of the electromagnetic field generated by the plasma discharge tube on glioblastoma cells without the effect from ROS or RNS did not induce cell death on cancer cells. However, the electro-magnetic field generated from the plasma discharge tube sensitizes glioblastoma cells and make them more susceptible to anti-cancer drugs such as TMZ. As explained above, the threshold of glioblastoma cells to resist TMZ was significantly decreased after they were sensitized by the plasma discharge tube generated electro-magnetic field. Therefore, the treatment effect of TMZ was significantly enhanced after cells were exposed to the plasma discharge tube.

The plasma discharge tube had no significant effect on non-cancerous E6/E7 cells while it induced significant cell death on U87 and A172 cells. Thus, the disclosed plasma discharge tube process allows selectively sensitization of cancer cells without implicating normal tissues. Therefore, the addition of plasma discharge tube to chemotherapy with temozolomide can result in significant improvement in cell response to treatment.

One of the benefits of plasma discharge tube when comparing the tube with the CAP jet is that unlike the regular CAP jet which relies on the helium supply coming into contact with air, all the helium of plasma discharge tube is isolated inside the discharge tube, so it does not require helium consumption. During the direct CAP jet treatment environmental changes such as distance, humidity, can cause variations in treatment. When using the plasma discharge tube, helium is isolated in the closed tube, environment change does not change the plasma discharge in the tube. In line with recent trends CAP devices that are smaller or wearable by patients are desirable. In this case, the enclosed plasma discharge tube is does not require the helium supply to generate the plasma jet and thus may be miniaturized and used as a wearable anti-cancer device.

Therefore, a combination treatment with plasma discharge tube and a cancer treatment such as TMZ enhances efficacy, minimizes the necessary dose and thus reduces side effects. The sensitization of cancerous cells using an electromagnetic field with other forms of treatments to eradicate cancerous cells may incorporate the disclosed principles. Such treatments may include various standard care chemotherapy drugs, RNS or ROS treatment, or radiation treatment. Although the examples above relate to cancerous brain glioblastoma cells, other cancerous cells such as breast cancer cells, pancreatic cancer cells, skin cancer cells, bladder cancer cells, colon cancer cells, or lung cancer cells, and corresponding tissues may be treated. Thus the standard treatment may reduced below a baseline level to account for the sensitized cells. For example, a relatively smaller volume of reactive species or chemotherapeutics may be used in conjunction with the electro-magnetic field treatment in comparison with the baseline volume required if the electromagnetic field treatment is not applied.

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for sensitization of cancerous cells in a volume including normal cells and the cancerous cells, comprising:
    a power supply;
    a plasma tube sealed on opposite ends including a pair of electrodes coupled to the power supply, the plasma tube generating a plasma jet between the electrodes; and
    a controller coupled to the power supply to control a discharge voltage to the electrodes to generate the plasma jet and direct an electro-magnetic field at the volume having cancerous cells and normal cells for a sufficient time to sensitize the cancerous cells.

2. The system of claim 1, further comprising a frequency generator coupled to the power supply and the electrodes through a power switch, the frequency generator operable to control the power switch at a discharge frequency, and wherein the electro-magnetic field is a pulsed electro-magnetic field.

3. The system of claim 2, wherein the controller is operative to change the discharge voltage between 2 and 10 kV or change the discharge frequency between 10-50 KHz generating the plasma jet in the plasma tube.

4. The system of claim 1, wherein the cancerous cells are one of brain cancer cells, breast cancer cells, pancreatic cancer cells, skin cancer cells, bladder cancer cells, colon cancer cells, or lung cancer cells.

5. The system of claim 1 further comprising a treatment system operable to apply a treatment to the sensitized cancerous cells after the cancerous cells are sensitized by the electro-magnetic field.

6. The system of claim 5, wherein the treatment is one of applying an oxygen or a nitrogen reactive species, applying radiation, applying H2O2, or chemotherapy.

7. The system of claim 5, wherein the treatment is chemotherapy, and wherein the treatment system is operable to be adjusted to apply the treatment below a baseline level in response to the sensitized cancerous cells.

8. A method of sensitizing cancerous cells in an area, the method comprising:
ionizing a gas in a tube sealed on both ends via supplying electrical power between an anode and a cathode to generate a cold atmospheric plasma jet; and
directing an electro-magnetic field from the generated cold atmospheric plasma jet toward the area for a sufficient time to sensitize the cancerous cells.

9. The method of claim 8, wherein the electro-magnetic field is pulsed at a pre-determined discharge frequency.

10. The method of claim 9, wherein a discharge voltage of the electro-magnetic field is between 2 and 10 kV and the discharge frequency is between 10-50 KHz.

11. The method of claim 8, wherein the sufficient time is greater than one minute.

12. The method of claim 8, wherein the cancerous cells are one of brain cancer cells, breast cancer cells, pancreatic cancer cells, skin cancer cells, bladder cancer cells, colon cancer cells, or lung cancer cells.

13. The method of claim 8, further comprising directing a treatment to the sensitized cancerous cells.

14. The method of claim 13, wherein the treatment is one of application of an oxygen reactive species or a nitrogen reactive species, application of H2O2, or application of radiation.

15. The method of claim 13, wherein the treatment includes administration of a chemotherapeutic.

16. The method of claim 15, wherein the chemotherapeutic is Temozolomide (TMZ).

17. The method of claim 13, further comprising reducing the treatment below a baseline level to account for the sensitized cancerous cells.

18. A method of treating a cancer patient comprising:
selecting a cancer patient that has been treated by a first treatment from a system, wherein the system includes:
a power supply;
a plasma tube sealed on opposite ends including a pair of electrodes coupled to the power supply, the plasma tube generating a plasma jet between the electrodes; and
a controller coupled to the power supply to control a discharge voltage to the electrodes to generate the plasma jet and direct an electro-magnetic field at a volume having cancerous cells on the cancer patient for a sufficient time to sensitize the cancerous cells; and
administering an effective dose of a second treatment for cancer to the cancer patient.

19. The method of claim 18, wherein the second treatment is one of: application of an oxygen reactive species or a nitrogen reactive species, application of H2O2, application of radiation, or administration of a chemotherapeutic.

20. The method of claim 19, wherein the chemotherapeutic is Temozolomide (TMZ).

\* \* \* \* \*